Figure 1:
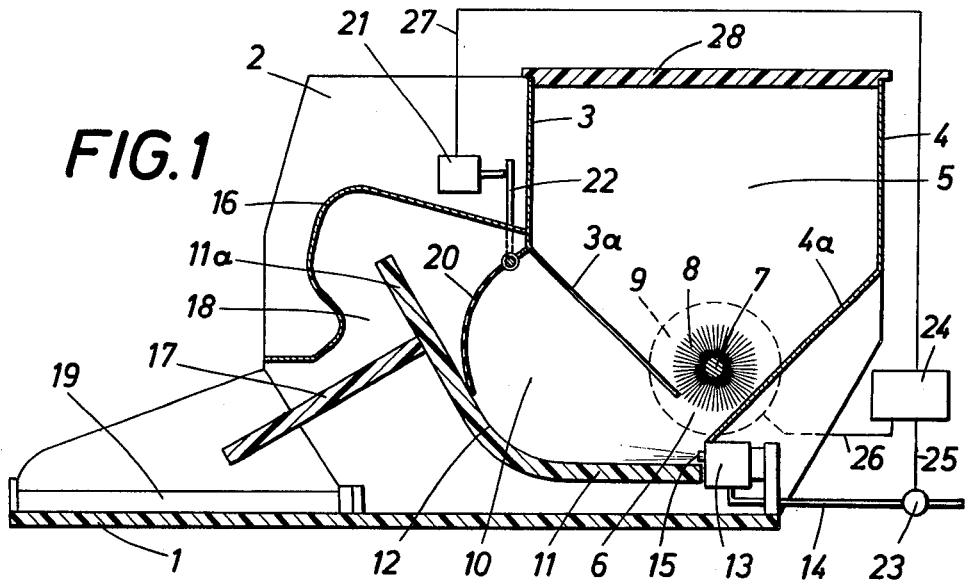

United States Patent [19]

Sticht et al.

[11] 4,063,642

[45] Dec. 20, 1977

[54] APPARATUS FOR SINGLING SMALL PARTS

[76] Inventors: Walter Sticht, Wankhamerstrasse 8; Wolfgang Steinleitner, Wienerstrasse 36, both of Attnang-Puchheim, Austria

[21] Appl. No.: 644,621

[22] Filed: Dec. 29, 1975

[30] Foreign Application Priority Data

Dec. 13, 1974 Austria .................................. 9988/74

[51] Int. Cl.² .............................................. B65G 51/02
[52] U.S. Cl. ...................................... 209/73; 221/160; 302/2 R; 198/398
[58] Field of Search .............. 221/156, 159, 160, 163, 221/167, 168, 200, 202, 203, 278, 173; 209/73, 74, 82, 85; 198/256, 278, 282, 289, 398; 302/2 R; 214/8.5 E

[56] References Cited

U.S. PATENT DOCUMENTS

| 1,437,409 | 12/1922 | Evans et al. | 221/167 |
| 2,501,403 | 3/1950 | McKinsey | 209/85 |
| 2,765,900 | 10/1956 | Seabrooke | 198/256 |
| 2,866,577 | 12/1958 | Dimond | 221/173 |
| 3,788,456 | 1/1974 | Ashibe | 198/220 A |
| 3,881,596 | 5/1975 | Miller | 198/289 X |

Primary Examiner—Robert B.
Assistant Examiner—Joseph J. Reeves Rolla
Attorney, Agent, or Firm—Kurt Kelman

[57] ABSTRACT

Entangled parts are singled by placing them in a holding container, discharging them through an outlet to a path of travel communicating therewith and arranged to deliver the parts along the path of travel to a flat receptacle capable of supporting a plurality of separated parts simultaneously. The dimensions of the discharge outlet and the path of travel are at least in one direction a multiple of the second largest dimension of the parts to permit simultaneous passage of a plurality of separate parts side-by-side.

19 Claims, 7 Drawing Figures

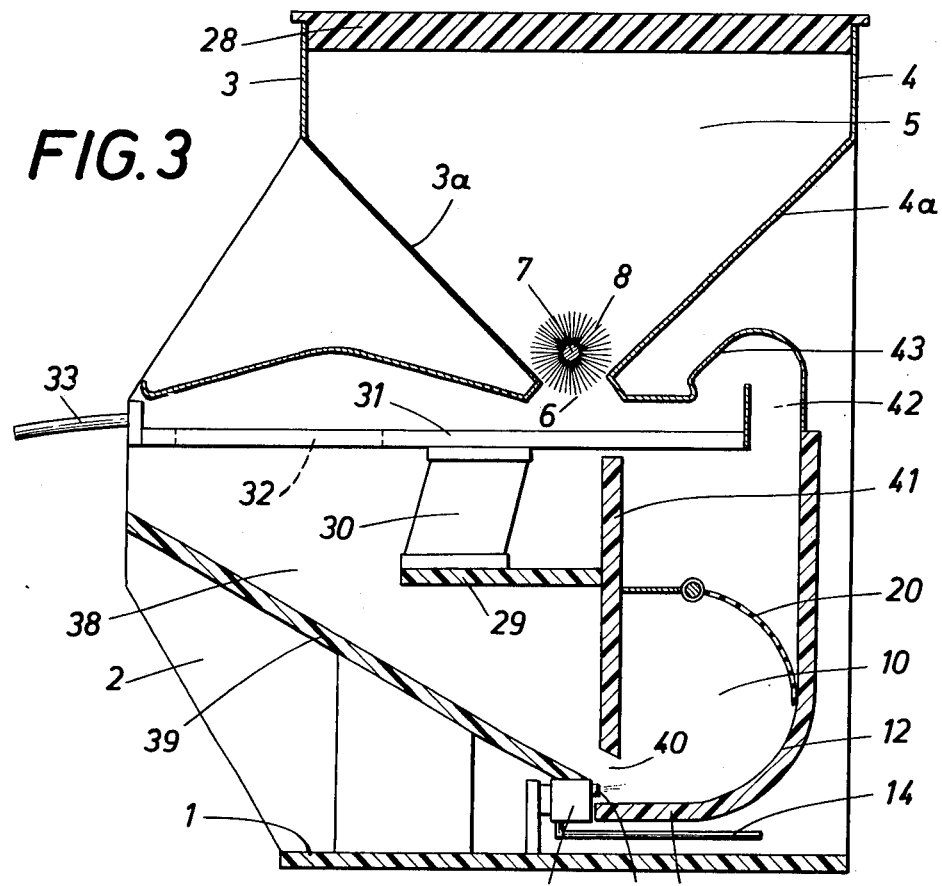
FIG.3
FIG.4
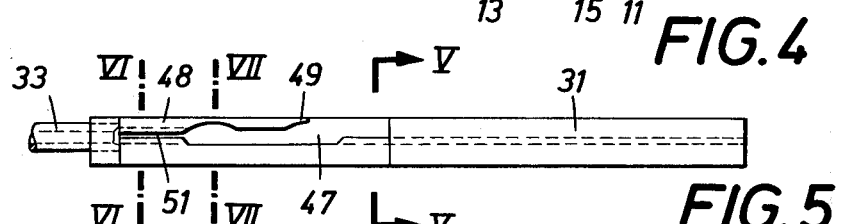
FIG.5
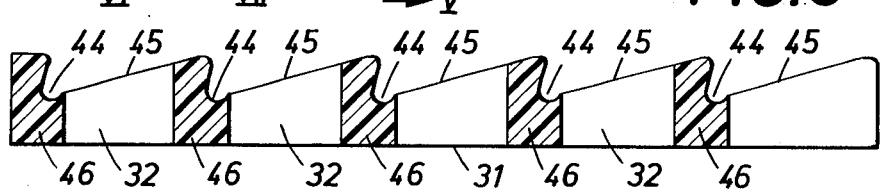
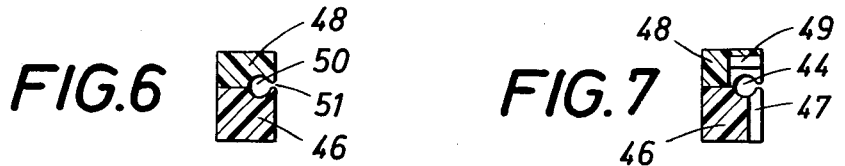
FIG.6  FIG.7

APPARATUS FOR SINGLING SMALL PARTS

This invention relates to apparatus for singling small parts, which are entangled or tend to adhere to each other, comprising a holding container for holding a randomly amassed quantity of parts and at least one discharge device which tends to separate the parts from each other and discharge the same through an outlet to at least one discharge station.

The parts may consist of springs, particularly coil springs, torsion springs, conical springs, as well as contact elements for switches, electronic components, such as transistors, or pins, small tubes, discs or the like, and each part may consist of two or more interconnected parts. Such parts are required in large quantities, particularly in mass production, and must be attached individually and often exactly in a predetermined orientation.

Known apparatus can be used only for parts of a certain class, e.g., cylindrical parts having approximately the same size, or headed pins, or discs. It is basically attempted in all known apparatus to single and to align the parts in the same region. For this purpose the parts to be singled are charged into a container, motion is imparted to the parts with or in said container, and the parts are then discharged through outlets which permit of the passage of only one part at a time and only in a predetermined direction. To impart the required movement to the parts, a fluid, particularly air or a liquid, is injected or blown into the container. One known apparatus comprises also a driven stirrer arm in the container.

A known apparatus for singling springs and tubes comprises an upright cylindrical container which is adapted to be charged with a supply of the parts and which is provided in its bottom with upwardly directed, diverging nozzles adapted to be fed with compressed air so that the parts are agitated in the container. Upwardly inclined discharge nozzles extend from the shell of the container and have a free cross-section which is only slightly smaller than the diameter of the cylindrical springs or little tubes. Each of these nozzles is surrounded by small air outlet openings. Only those parts can escape through the nozzles which fly toward the nozzle opening and which have an axis that is aligned with the axis of the nozzle. A very large number of springs must be moved before one spring can escape through the outlet. For this reason the yield of aligned parts is small compared to the expenditure involved. The nozzles may be clogged by parts connected at their ends. Delicate parts are subjected to heavy wear. Besides, those parts which have been agitated but have not been discharged may re-entangle when they fall back into the supply. Similar disadvantages are involved in all known apparatus of this kind.

In the design of all known apparatus it has been overlooked that it is sufficient for numerous assembling operations to feed the assembling station with parts which have been singled but have not been aligned. There is a need for a supply not only of singled symmetrical parts, which are the only ones that could be singled before, but also of numerous smaller singled parts which are irregularly shaped and some of which have been mentioned hereinbefore and which also include circlips, capacitors, resistors. Because small plates may adhere to each other as a result of surface adhesion, there is also often a desire to single small plates.

It is an object of the invention to provide structurally simple apparatus which enables a singling even of irregular parts and which operates with a high efficiency, i.e., which requires only a few movements of parts per singled part, and which can single different parts, as far as possible, or can easily be adjusted for singling different parts, and can also be used to single parts having a delicate surface, e.g., a coating of a noble metal.

An apparatus according to the invention is characterized in that the dimensions of the outlet of the holding container and of the path of travel disposed between the outlet and receiving means is at least in one direction a multiple of the smaller main dimension of the parts so that a plurality of parts can simultaneously pass through side-by-side, and that the receiving means can simultaneously support a plurality of separate parts. The receiving means may constitute a discharge station or an inlet of a separate sorting station that precedes the discharge station.

The invention is based on the concept that the efficiency will be reduced if parts which have been disentangled or separated can re-entangle. For this reason, the discharge is accomplished as soon as at least a preselected degree of separation has been reached. Because a plurality of parts can pass through the outlet, there is no risk of an entangling of parts adjacent to the outlet, and the parts can pass in different relative positions through such outlet. Adjacent to the receiving means an entangling of parts is avoided as far as possible. The apparatus can single different parts and can easily be adjusted to special purposes. When it is desired or necessary to align the parts, the singling apparatus is succeeded by an aligning station, in which a predetermined orientation is imparted to the parts or parts having an orientation which differs from the prescribed orientation or which are still interconnected are rejected. This rejection of still connected parts affords the advantage that the parts will be only slightly stressed during the singling operation. With given parts, a certain time of treatment will result in a certain degree of separation. In knon apparatus, only singled parts can be discharged so that they must be subjected to a considerable singling pretreatment. On the other hand a relatively short time of treatment is sufficient in most cases for a separation of only slightly connected parts from the mass of more strongly connected parts. If parts which are still connected and have been ejected by the rejecting means are again subjected to the singling treatment, it will be sufficient, on an average, to subject each part to the action of the discharge device only to an extent which corresponds to the degree to which said part is connected to other parts. It is also possible to provide two or more singling units, each of which comprises a receiving container and a discharge device, and which are connected in series or parallel, or a relatively simple singling unit may feed sorting means which reject connected parts or parts having an orientation which differs from a predetermined, desired orientation, but forward singled parts, and the parts rejected by the sorting means may be fed to another singling unit which delivers parts that are singled to a high degree.

The singling may be effected by swirl chambers which will be described more fully hereinafter. In a particularly simple embodiment, however, the discharge device consists of at least one circular brush which is disposed below the charge level of a holding or supply container, and which brush has basically the shape of a solid of revolution and is adapted to be driven so as to rotate on its axis and at least during a rotation in one sense feeds singled parts contained in the supply container through the outlet.

Even a simple brush will be sufficient to discharge individual parts from a supply of entangled parts. The density of the bristles, the arrangement of the bristles or other bibrous elements of the brush, and the force exerted by the bristle on a cooperating surface will be selected in dependence on the parts to be disentangled. In the simplest case, a brush will be used which has radial bristles and cooperates with a backing surface which is spaced from the brush approximately by the length of the bristles so that the brush when driven feeds the parts on the backing surface. The gap between the core of the brush and the cooperating surface must exceed the smaller main dimension of the parts to be singled. A plurality of handling brushes which have mutually supplementary functions may be arranged one behind the other in a predetermined path, e.g., in such a manner that the brushes which are nearer to the supply container single the parts and the other brushes align the singled parts and feed them in conveyor troughs or the like.

To align the singled parts and to continue the feeding thereof, a longitudinal conveyor consisting of a linear conveyor may be provided, which comprises longitudinal troughs which extend in the direction of travel and have a sectional shape which conforms to a projection surface of the singled parts so that it is sufficient for an adaptation to different singled parts to replace that part of the linear conveyor which is provided with the troughs. Even more complicated parts can be exactly aligned in predetermined positions by a plurality of linear conveyors which are arranged one beside the other and have mutually transverse directions of conveyance and by deflectors, guiding surfaces or the like for parts which have an orientation that differs from a predetermined desired orientation. For instance, the first linear conveyor determines on which of their surfaces or sides the parts are to stand. The following linear conveyor or conveyors then effect a step-by-step alignment of the axis of the bearing surface relative to the respective direction of conveyance, or an ejection of parts which deviate from this desired position.

Further details and advantages of the invention will become apparent from the following description of the accompanying drawings, in which the subject matter of the invention is shown by way of example.

Figure 2:
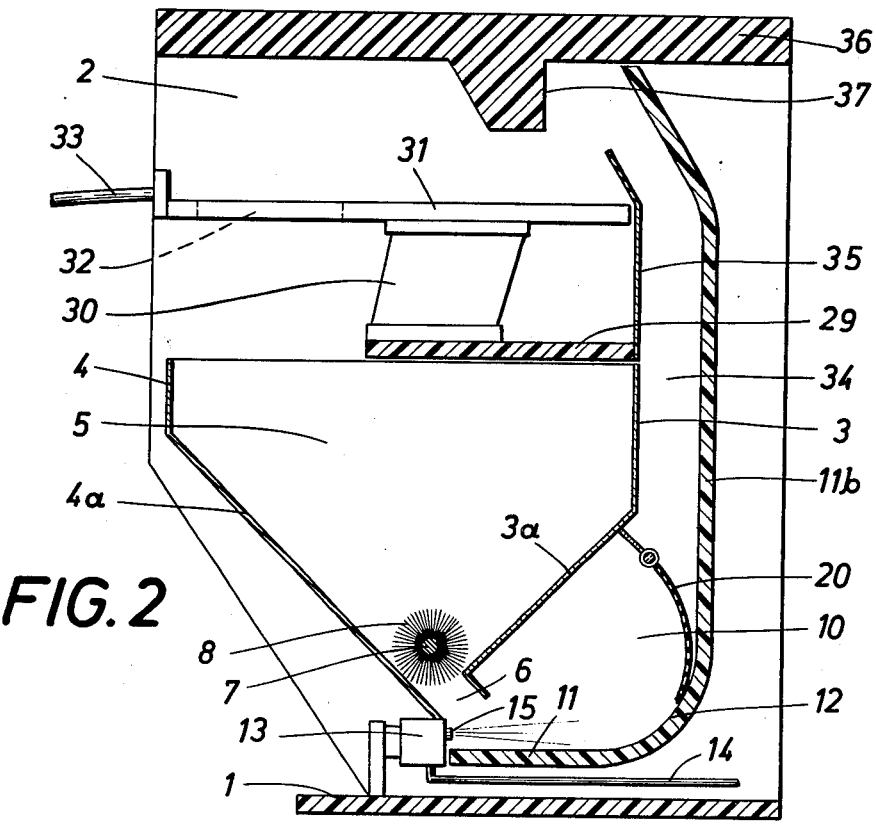

FIG. 1 is a longitudinal sectional view showing simple apparatus for singling entangled parts to be assembled, FIG. 2 is a view similar to FIG. 1 and shows apparatus for singling and aligning parts to be assembled, FIG. 3 shows apparatus which has the same purpose as that of FIg. 2 but a different arrangement of the supplementary subassemblies, FIG. 4 is a side elevation showing a top portion of a linear conveyor used in the aligning station, FIGS. 5, 6 and 7 are enlarged sectional views taken on lines V—V, VI—VI, and VII—VII in FIG. 4.

The apparatus shown in FIG. 1 comprises a baseplate 1 and spaced apart upright side walls 2 secured to said baseplate. These side walls 2 may be parallel or may diverge.

A gutterlike supply container 5 is defined by metal plates 3, 4 inserted between the two side walls and at its lower end has an outlet 6 formed by a gap between the converging portions 3a, 4a of the metal plates. In the embodiment shown by way of example, the outlet extends throughout the distance between the two side walls 2. This distance is in any case several times the smaller main dimension of parts to be singled. A conveyor brush is disposed within the supply container 5 and consists of a core 7 and fibrous elements 8 and in position of rest closes the outlet 6. Rotation can be imparted to the brush by a motor 9 indicated by dotted lines. The distance from the core 7 to the plate portion 4a exceeds the smaller main dimension of the parts to be singled and if these parts have the shape of elongated cylinders exceeds the largest diameter of the part.

The outlet 6 is also the inlet of a swirl chamber 10, which constitutes another receptacle and is defined at its bottom by a platelike insert 11 which extends approximately horizontally from right to left between the side walls 2 and then merges by an arcuate portion into an upwardly inclined portion 11a, defining guiding surface 12. A nozzle bar 13 is disposed below the outlet 6 and carries blast nozzles 15 which are adapted to be fed with compressed air individually, jointly, or in groups through one conduit or a plurality of conduits 14. Some of these nozzles extend horizontally parallel to the upper surface of part 11, and others of the nozzles may be upwardly inclined.

The upper end 11a of the insert 11, sheet metal baffle part 16 which has a plurality of bends and may be perforated, if desired, and a downwardly inclined additional baffle part 17 define a passage 18 for the parts to be handled. This passage has an upwardly extending inlet portion which is succeeded by a downwardly extending portion. The baffle part 17 at the lower end portion of the passage 18 forms a chute which delivers ejected parts to a receiving pad 19. In condition of rest, the swirl chamber 10 is separated from the passage 18 by a hinged perforated plate 20 or another shut-off member. In the embodiment shown by way of example, the hinged plate 20 is adapted to be pivotally moved in a counterclockwise sense from its illustrated position of rest into the chamber 10 to open a path from the swirl chamber 10 into the passage 18. This pivotal movement can be imparted to the hinged plate 20 by a fluid-operated actuator 21 or a solenoid and a lever 22.

To control the motor 9 for driving the brush, the supply of compressed air to the nozzles 15 through conduit 14 and a shut-off valve 23 incorporated in the latter, and the actuator 21 for operating the hinged plate 20, a central control panel 24 is provided, which is only diagrammatically indicated and which is connected to the units 9, 21, 23 by control lines 25, 26, 27.

In the operation of the apparatus, a supply of entangled parts is charged into the storage container 5 and a cover 28 is then closed. This cover serves to dampen the noise and prevents parts from flying out of the container. The cover 28 may be airpermeable, if desired, so that part of the compressed air which is supplied in the manner described hereinafter can escape through the cover 28.

The motor 9 is energized from panel 24 for a programmed period of time so that the brush 7, 8 is driven and discharges at least partly singled parts separated from the supply through the outlet 6 into the swirl chamber 10. With each kind of parts the rate at which the parts are handled by the brush is approximately constant so that the brush has a metering function and feeds a certain number of parts within a certain time to the swirl chamber 10 which constitutes a receptacle. If the brush conveyor is omitted, the storage container 5 or the swirl chamber 10 can be fed by separate metering means, such as weighing means, with a certain batch of parts to be singled continually. At the time at which the energization of the motor 9 is initiated or at a somewhat later time, the central control panel 24 operates the shut-off valve 23 to initiate the supply of compressed air to the nozzles 15. Depending on the nature of the parts and the degree of the entanglement of the parts, the compressed air may be supplied uniformly, or a pulsed or intermittent supply of compressed air changing from nozzle to nozzle may be adopted. Virtually for every kind of parts, the optimum combination of operating conditions can be empirically determined within a short time. In any case, the supply of parts in the chamber 10 is thoroughly agitated so that any entangled parts are disentangled by their impact on the walls and the hinged plate 20 or by the action of the jets of compressed air. As soon as a certain supply of parts is contained in the swirl chamber 10, the drive of the brush 7, 8 is discontinued and at the same time or some time thereafter the hinged plate 20 is opened whereas the supply of compressed air is continued. Depending on the programming of the time during which the hinged plate is open, some of the parts contained in the swirl chamber 10 or the entire supply of parts contained therein can enter the passage 18. Because the latter has a plurality of bends, the parts impinge several times on the walls which define said passage. The kinetic energy imparted to the parts by the compressed air varies and is dissipated to different degrees because the several parts move different distances so that the parts are scattered as they fall on the pad 19 and remain virtually separated on the latter. The metered rates at which the parts enter the swirl chamber and at which they are discharged from the swirl chamber will depend on the capacity of the receiving surface of the pad 19. The parts may be directly taken by hand from the pad 19. Any entangled parts which have been ejected are simply thrown back into the supply container 5. A switch may be provided at the discharge station 19 and may be operated to initiate the operation of the central control panel 24 whenever a new supply of singled parts is required.

The embodiment shown in FIG. 2 comprises numerous components of the embodiment shown in FIG. 1. These identical or similar components are designated by the same reference characters as in FIG. 1. For the sake of simplicity, the central control panel and the drive means and shut-off means controlled thereby have not been shown again. The brush 7, 8 is driven in the counterclockwise sense.

The important difference from the embodiment shown in FIG. 1 is a sorting station provided above the supply container 5 and consisting of an electrically operated vibrator 30 which is mounted on a plate 29, and a linear conveyor 31 which adapted to be driven by said vibrator.

The linear conveyor will be explained more fully with reference to FIGS. 4 and 7. In connection with FIG. 2 it is sufficient to state that the conveyor 31 has a plurality of conveyor tracks in which parts are received and fed from right to left. Any parts which have an orientation that differs from a predetermined desired orientation or which are still entangled are rejected through slots 32 and fall into the supply container 5. The aligned parts are fed through rigid or flexible tubes 33 to the discharge station. When the hinged plate 20 has been opened, the linear conveyor 31 is fed with singled parts from the swirl chamber 10. These parts are upwardly entrained by the compressed air in a passage 34, which is defined by an upwardly extending extension 11b of portion 11, one side wall 3 of the supply container, a deflecting plate 35 and a cover plate 36. The cover plate 36 is provided with a baffle surface 37 for intercepting the ejected parts and for guiding the same onto the linear conveyor 31. The possible programs have already been explained with reference to FIG. 1. The sectional shape of each of the parallel conveyor troughs of the linear conveyor 31 conforms to one projection surface of the parts to be singled. If the parts are cylindrical springs, the troughs will usually have a semicircular section. Deflecting surfaces or other deflecting or rejecting means ensure that still entangled parts and singled parts which have an orientation that differs from the desired orientation will be rejected.

In the embodiment shown in FIG. 3, the right-hand portion of the linear conveyor 31 constitutes the receiving surface for the singled parts and is somewhat extended to the right. The brush 7, 8 in the supply container 5 extends transversely to the longitudinal troughs of the linear conveyor 31. The outlet 6 is disposed closely above the receiving surface of the linear conveyor. When the brush 7, 8 is driven it throws the parts to be singled directly onto the linear conveyor. The combing action exerted by the brush on the supply of parts results in a prealigning of elongated parts so that they move through the outlet approximately in the longitudinal direction or only at a small angle, and the action of the linear conveyor on parts which rest already on the linear conveyor but are still held by the brush contributes to the longitudinal aligning of the parts. Rejected parts, which consist mainly of still entangled parts, fall through the openings 32 onto a deflecting surface 39 which forms the lower portion of a gutter 38, and thus reach an outlet 40 disposed over the blast nozzles 15 which again cooperate with the swirl chamber 10. When the hinged plate 20 is opened as described hereinbefore, the parts can emerge upwardly through a passage 42 and after contacting the deflecting surfaces 43 are ejected onto the right-hand end of the linear conveyor 31. The linear conveyor 30, 31 is supported by the inside wall 41 of the gutter 38. The apparatus shown in FIG. 3 is preferably operated intermittently. The brush 7, 8 is operated for a predetermined period of time first. The operation of the brush 7, 8 is then discontinued. This is followed by the opening of the hinged plate 20 so that the agitated parts are ejected out of the swirl chamber 10.

A linear conveyor will now be described more fully with reference to FIGS. 4 and 7.

The right-hand portion 31 consists of a plate which has on its upper side a sawtooth-shaped profile so that longitudinal troughs 44 are formed, which in the embodiment shown by way of example are assumed to be intended for cylindrical parts, such as coil springs. Downwardly inclined surfaces 45 are disposed between the troughs 44. Parts impinging on the downwardly inclined surfaces 45 are guided by the latter into the longitudinal troughs 44, in which the parts are conveyed to the left by the vibration. Bars 46 form troughs 44 so that openings 32 are left between these bars. As is apparent from the sectional view of FIG. 7, the trough 44 is milled off almost to the middle thereof in a predetermined length portion and thus constitutes a balancing bar. The recess 47 causes those springs which do not snugly contact throughout their length the remaining portion of the trough 44 to fall down. The length of the recess 47 exceeds the length of each spring. Whereas only bars 46 are shown in FIGS. 2 and 3, it is apparent from FIGS. 5 to 7 that extensions 48 are mounted on the bars and have end portions 49 which face the arriving springs and act as deflectors which engage upwardly extending portions of the springs so that such springs are either forced into the correct orientation or are rejected. The singled springs finally enter an annular channel 50 which is also accessible through a lateral gap 51 so that any parts seized here can be pushed back by the insertion of a needle. In the embodiment shown in FIG. 2, virtually the entire upper surface of the linear conveyor 31 is accessible by hand so that any trouble can easily be eliminated.

The axes of springs which are connected end to end are virtually never aligned and for this reason such springs are rejected on the linear conveyor 31 through opening 32. From the linear conveyor, the springs enter flexible or rigid tubes 33 in which they are conducted to discharge stations. Devices for a manually or automatically controlled discharge of individual parts from such flexible tubes are known and for this reason need not be described more fully.

The plate 31 provided with the bars 46 is selected to conform to the parts to be assembled. Various other arrangements and groupings or designs of the singling units may be adopted within the scope of the invention. For special cases, a simple apparatus could be used which consists only of a container 5 which is secured in a base frame. A drawer is arranged below the outlet and is operatively connected to the brush 7, 8 in such a manner that, when the drawer is pulled out, the brush delivers singled parts out of the container 5 for deposition in the drawer. Alternatively, the outlet of the apparatus may be disposed above a conveyor belt or linear conveyors other than those shown may be used.

What is claimed is:

1. Apparatus for singling small parts which have a largest dimension and a second-largest dimension, comprising
    a holding container adapted to hold a plurality of said parts which are in contact with each other,
    receiving means adapted to support simultaneously a plurality of separated parts,
    transfer means defining a path of travel which communicates with said container, said transfer means being arranged to deliver parts along said path of travel to said receiving means,
    discharge means for discharging parts out of said holding container to said path of travel,
    the dimensions of said discharge means and path of travel being at least in one direction a multiple of the second-largest dimension of each of said parts whereby said discharge means and path of travel permit simultaneous passage of a plurality of separate parts side-by-side,
    a discharge station, and
    sorting means adapted to receive parts from said receiving means and arranged to deliver to said discharge station only separate parts having a predetermined, desired orientation and to reject other parts, and
    collecting means arranged to receive the parts rejected by said sorting means.

2. Apparatus as set forth in claim 1, which further comprises
    an additional receptacle which has an outlet communicating with said receiving means and is adapted to receive parts from said collecting means, and
    additional discharge means for discharging separate parts out of said additional holding container through said outlet thereof to said receiving means.

3. Apparatus for singling small parts which have a largest dimension and a second-largest dimension, comprising
    a holding container defining a swirl chamber and adapted to hold a plurality of said parts which are in contact with each other,
    receiving means adapted to support simultaneously a plurality of separated parts,
    transfer means defining a path of travel which communicates with said container, said transfer means being arranged to deliver parts along said path of travel to the receiving means,
    a discharge device for discharging parts out of the holding container to said path of travel, the discharge device comprising a bank of inlets for blowing compressed air into the swirl chamber to cause separated parts to fly to said path of travel, the dimensions of said discharge device and path of travel being at least in one direction a multiple of the second-largest dimension of each of said parts whereby said discharge device and path of travel permit simultaneous passage of a plurality of separate parts side-by-side, and
    a shut-off member adapted to close the path of travel at its receiving end, the shut-off member being adapted to be opened for the discharge of separated parts to the path of travel when compressed air is blown through the inlets.

4. Apparatus as set forth in claim 3, which comprises metering means for charging parts at least at a predetermined rate into said swirl chamber.

5. Apparatus as set forth in claim 3, in which
    said holding container has two mutually opposite, longitudinal side walls, one of which is formed with a charging opening for charging said parts into said swirl chamber,
    said inlets comprise blast nozzle means which open in said swirl chamber below said charging opening and are directed away from said charging opening,
    said swirl chamber contains upwardly extending, arcuate deflecting surfaces disposed at the other of said longitudinal side walls and leading to said path of travel, and
    said path of travel comprises a transfer passage which has an exit opening disposed above said receiving means.

6. Apparatus as set forth in claim 5, in which said shut-off member is a plate which is hinged on that side of said transfer passage which is opposite to said deflecting surfaces and said plate is adapted to be swung open into said swirl chamber.

7. Apparatus as set forth in claim 5, which comprises air-permeable wall means defining said transfer passage.

8. Apparatus for singling small parts which have a largest dimension and a second-largest dimension, the parts having a projecting surface, comprising
    a holding container adapted to hold a plurality of said parts which are in contact with each other,
    a vibratory longitudinal conveyor arranged to receive separated parts, the conveyor having longitudinal troughs extending in the direction of travel of the conveyor and having a sectional shape conforming to the projecting surfaces of the parts to support simultaneously a plurality of separated parts, transfer means defining a path of travel which communicates with said container, said transfer means being arranged to deliver parts along said path of travel to said receiving means, and discharge means for discharging parts out of said holding container to said path of travel, the dimensions of said discharge means and path of travel being at least in one direction a multiple of the second-largest dimension of each of said parts whereby said discharge means and path of travel permit simultaneous passage of a plurality of separate parts side-by-side.

9. Apparatus as set forth in claim 8, in which guiding surfaces for guiding said parts are disposed between said longitudinal troughs adjacent to said receiving means and are downwardly inclined toward said troughs.

10. Apparatus as set forth in claim 8, in which
said troughs have delivery ends remote from said receiving means,
tubes are connected to said delivery ends and are adapted to receive said parts one after the other from said delivery ends, and
a taking station is arranged to receive parts from said tubes.

11. Apparatus as set forth in claim 8, in which
each of said longitudinal troughs defines an individual path of travel, which is adjoined by deflecting means for preventing the passage of misaligned parts having an orientation which differs from a predetermined, desired orientation.

12. Apparatus as set forth in claim 11, in which said deflecting means are arranged to reject said misaligned parts.

13. Apparatus as set forth in claim 11, in which said deflecting means are arranged to align said misaligned parts to said predetermined, desired orientation.

14. Apparatus as set forth in claim 11, in which said deflecting means comprise balancing bars.

15. Apparatus as set forth in claim 11, in which said deflecting means comprise deflecting surfaces.

16. Apparatus as set forth in claim 11, in which
said linear conveyor is succeeded by another linear conveyor, which extends transversely to the first-mentioned linear conveyor and comprises deflecting means for rejecting misaligned parts having an orientation which differs from a predetermined, desired orientation.

17. Apparatus for singling small parts which have a largest dimension and a second-largest dimension, comprising
a holding container adapted to hold a plurality of said parts which are in contact with each other, the holding container having an outlet defining a path of travel in communication with the holding container,
receiving means disposed below the holding container and having a plurality of longitudinal troughs extending side-by-side, the outlet constituting a transfer means arranged to deliver parts along the path of travel to the receiving means,
a circular brush rotatable on an axis transverse to the longitudinal troughs for discharging parts out of the holding container to the outlet, the dimensions of the brush and the outlet at least in one direction being a multiple of the second-largest dimension of each of said parts whereby the brush and outlet permit simultaneous passage of a plurality of separate parts side-by-side,
a discharge station,
sorting means adapted to receive parts from the receiving means and to deliver sorted separate parts to the discharge station, the sorting means being arranged to deliver to the discharge station only separate parts having a predetermined, desired orientation and to reject other parts,
collecting means comprising a gutter arranged to receive the parts rejected by the sorting means,
a receptacle defining a swirl chamber adapted to receive the parts from the gutter, the receptacle having an outlet communicating with the receiving means,
additional discharge means discharging separate parts out of the swirl chamber through the outlet of the receptacle to the receiving means.

18. Apparatus for singling small parts which have a largest dimension and a second-largest dimension, comprising
a holding container defining a swirl chamber and adapted to hold a plurality of said parts which are in contact with each other, the holding container having a charging opening,
receiving means adapted to support simultaneously a plurality of separated parts,
transfer means defining a path of travel which communicates with said container, said transfer means being arranged to deliver parts along said path of travel of the receiving means,
discharge means comprising blast nozzles for blowing compressed air into said swirl chamber for discharging parts out of the holding container to said path of travel, the dimensions of the discharge means and path of travel being at least in one direction a multiple of the second-largest dimension of each of said parts whereby said discharge means and path of travel permit simultaneous passage of a plurality of separate parts side-by-side,
at least one additional receptacle having an outlet and adapted to hold a plurality of said parts which are in contact with each other, the outlet of the receptacle communicating with the charging opening of the holding container whereby the holding container is adapted to receive parts from the outlet of the receptacle, and
additional discharge means comprising a conveyor brush for discharging parts out of the receptacle through the outlet thereof for transfer to said receiving means, the dimensions of the receptacle outlet being at least in one direction a multiple of the second-largest dimension of each of the parts whereby the receptacle outlet permits simultaneous passage of a plurality of said parts therethrough side-by-side.

19. Apparatus for singling small parts which have a largest dimension and a second-largest dimension, comprising
a holding container adapted to hold a plurality of said parts which are in contact with each other,
receiving means adapted to support simultaneously a plurality of separated parts,
transfer means defining a path of travel which communicates with said container, said transfer means being arranged to deliver parts along said path of travel of said receiving means, discharge means for discharging parts out of said holding container to said path of travel, the dimensions of said discharge means and path of travel being at least in one direction a multiple of the second-largest dimension of each of said parts whereby said discharge means and path of travel permit simultaneous passage of a plurality of separate parts side-by-side, a discharge station, and sorting means adapted to received parts from said receiving means and to deliver sorted separate parts to said discharge station, the sorting means comprising means for rejecting misaligned parts having an orientation which differs from a predetermined, desired orientation.

* * * * *

UNITED STATES PATENT AND TRADEMARK OFFICE
CERTIFICATE OF CORRECTION

PATENT NO. : 4,063,642
DATED : Dec. 20, 1977
INVENTOR(S) : Walter Sticht et al

It is certified that error appears in the above–identified patent and that said Letters Patent are hereby corrected as shown below:

On the title page, under /30/, delete
    "Dec. 13, 1974   Austria ............ 9988/74"
and insert thereinstead:--
    May 20, 1975   Austria ............ A 3826/75
    May 21, 1975   Austria ............ A 3865/75

Signed and Sealed this

Eighth Day of May 1979

[SEAL]

Attest:

RUTH C. MASON
*Attesting Officer*

DONALD W. BANNER
*Commissioner of Patents and Trademarks*